Feb. 28, 1956  D. A. FOGG  2,736,451
PULL BOX FOR ELECTRICAL CONDUIT LINES
Filed March 17, 1952  3 Sheets-Sheet 1
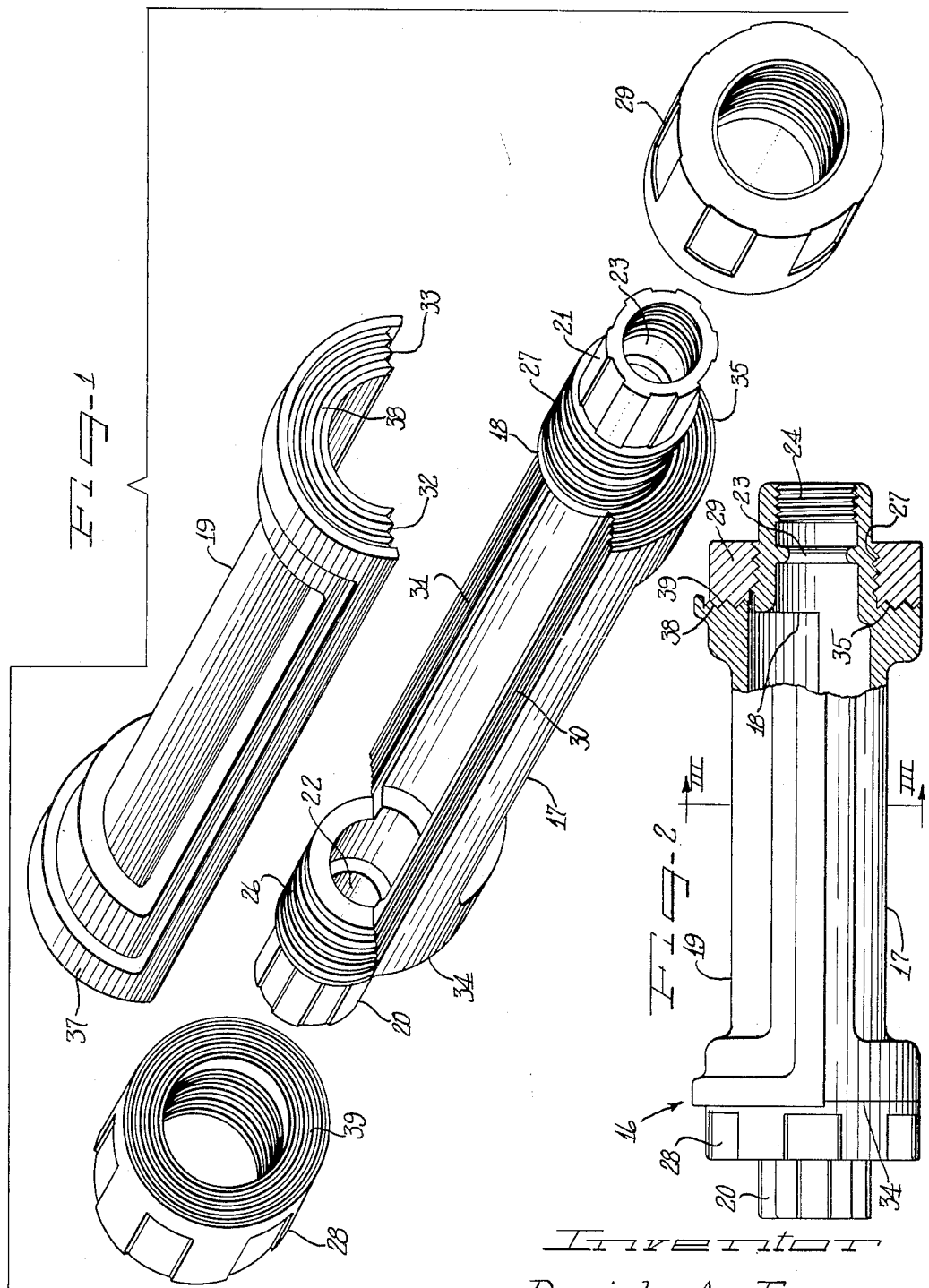
Inventor
Daniel A. Fogg

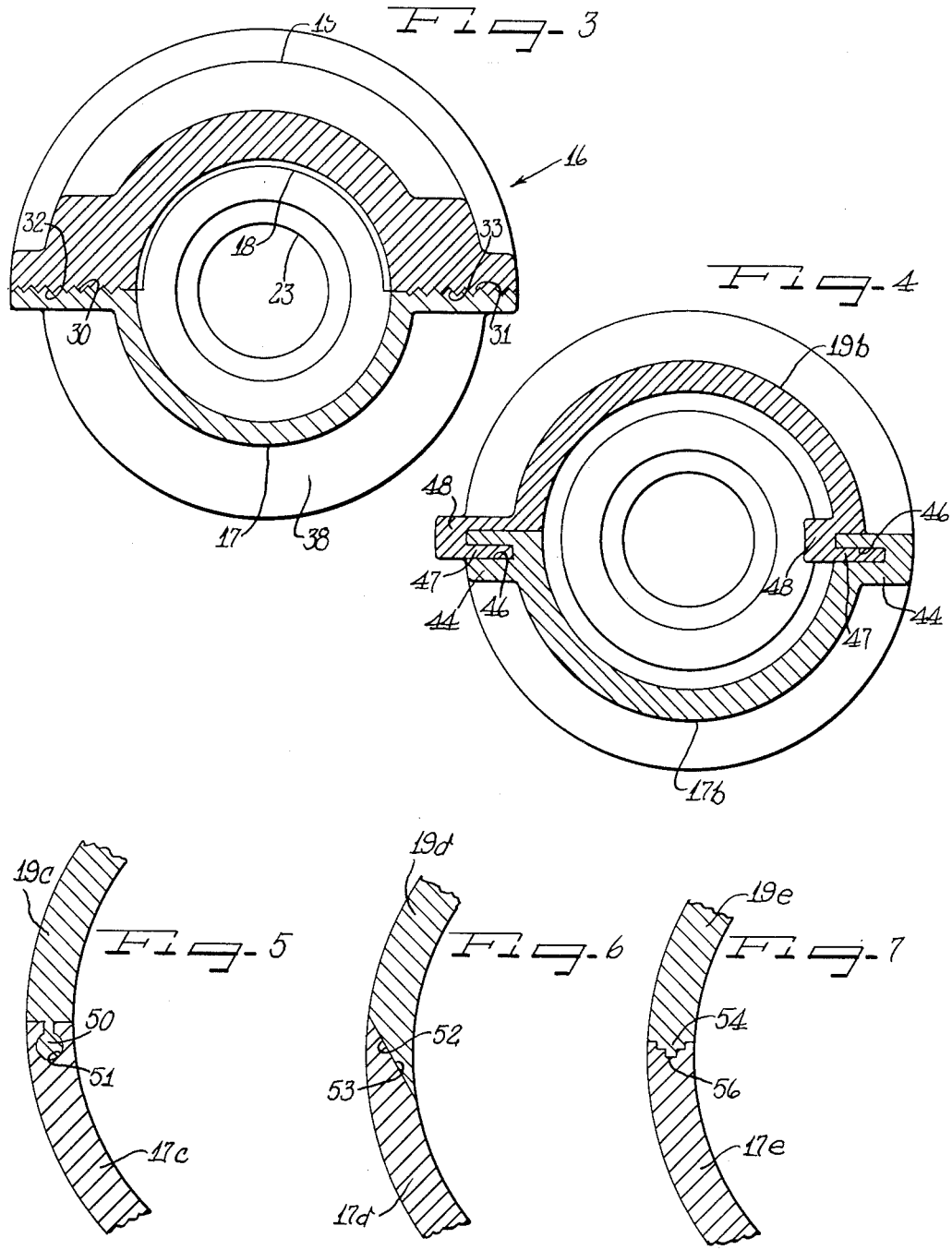

Feb. 28, 1956 D. A. FOGG 2,736,451
PULL BOX FOR ELECTRICAL CONDUIT LINES
Filed March 17, 1952 3 Sheets-Sheet 3
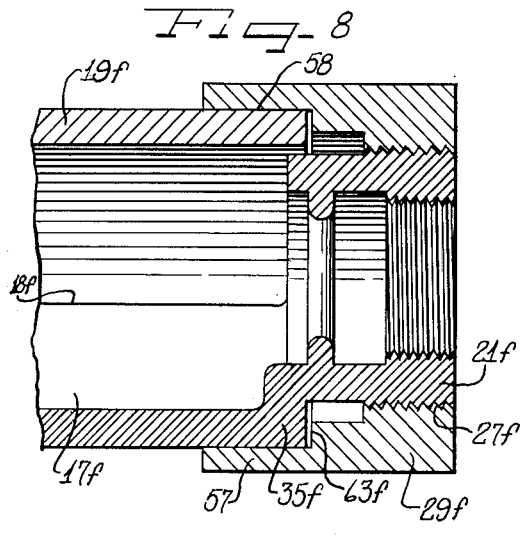
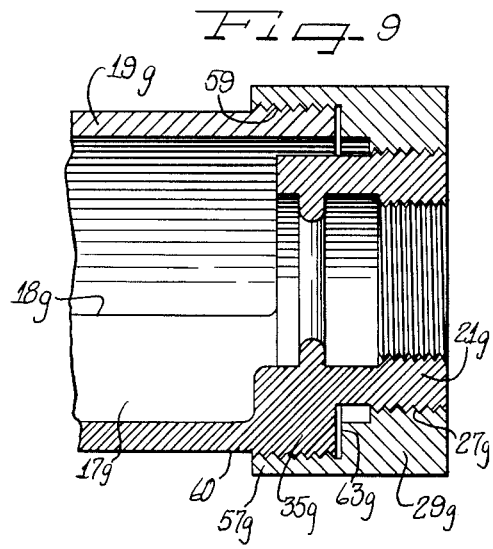
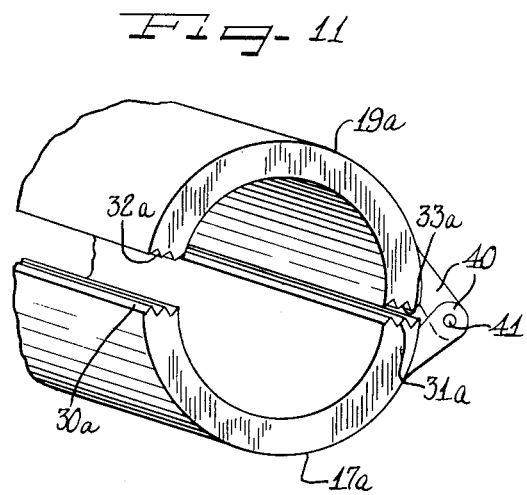
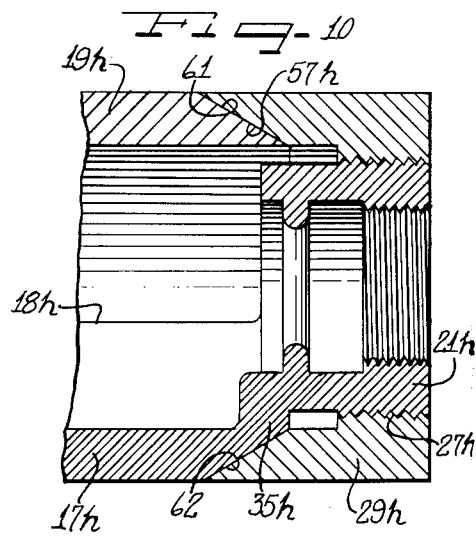
Inventor
Daniel A. Fogg United States Patent Office 2,736,451
Patented Feb. 28, 1956

2,736,451

PULL BOX FOR ELECTRICAL CONDUIT LINES

Daniel A. Fogg, Chicago, Ill., assignor to The Pyle-National Company, Chicago, Ill., a corporation of New Jersey Application March 17, 1952, Serial No. 276,956

5 Claims. (Cl. 220—3.8)

This invention relates generally to explosion-proof electrical apparatus and more particularly to an improved pulling and splicing fitting for electrical conduit lines wherein a hollow body having an access opening in the walls thereof closed by a cover is provided with intermating abutment means between the cover and the body to form an explosion-proof joint around the periphery of the opening, the intermating abutment means operating to retain the cover and the body in firm assembly.

According to the general principles of the present invention, a pull box for electrical conduit lines is provided and includes a body which is essentially trough-shaped in cross-section. The body is provided with cylindrical end portions which are formed with conduit-receiving passages. A cover extends between the end portions and is provided with end faces lying in registry with end face portions formed on the body adjacent each of the end portions. A retainer nut is threaded onto each of the end portions of the body. The retainer nuts are also provided with end faces so that the nuts may be placed in abutting relationship against the corresponding end face portions on the body and the cover. The abutment surfaces between the cover, the body and the retainer nuts are either made irregular in cross-section or are elongated so as to form an explosion-proof joint. It will be appreciated that an irregular abutment surface will form a tortuous path capable of rendering the joint explosion-proof and an elongated abutment surface will form a path of sufficient length as to render the joint effected thereby explosion-proof.

It is an object of the present invention, therefore, to provide an improved pulling and splicing fitting for electrical conduit lines.

Another object of the present invention is to provide a pull box for electrical conduit lines having an access opening closed by a cover retained in assembly with the pull box by abutment means which develop the dual function of forming an explosion-proof joint around the periphery of the cover.

Many other objects, features and additional advantages of the present invention will become manifest upon making reference to the detailed description which follows and the accompanying sheets of drawings, in which preferred structural embodiments incorporating the principles of the present invention are shown by way of illustrative example only:

Figure 1 is an exploded isometric view showing a pulling and splicing fitting for electrical conduit lines incorporating the principles of the present invention;

Figure 2 is a reduced elevational view with parts broken away and parts shown in cross-section of the pulling and splicing fitting shown in Figure 1;

Figure 3 is an enlarged cross-sectional view taken substantially on line III—III of Figure 2;

Figure 4 is a cross-sectional view of an alternative modification according to the principles of the present invention;

Figure 5 is a fragmentary cross-sectional view of a modified abutment means provided in accordance with the principles of the present invention;

Figure 6 is a fragmentary cross-sectional view of a further modified abutment means provided in accordance with the principles of the present invention;

Figure 7 is a fragmentary cross sectional view of yet another modified abutment means provided in accordance with the principles of the present invention;

Figure 8 is an end construction which may be effectively used in combination with the various abutment means shown in Figures 3–7;

Figure 9 is a modified end construction which may be employed in accordance with the principles of the present invention;

Figure 10 is yet another modification of an end construction provided in accordance with the principles of the present invention; and Figure 11 shows another modification provided in accordance with the principles of the present invention.

As shown on the drawings:

Referring first to Figures 1–3, a pulling and splicing fitting 16 for electrical conduit lines is shown which comprises a body member 17 of generally cylindrical or tubular configuration and being provided with an access opening 18 in the walls thereof which is closed by a cover 19.

More specifically, the body 17 is trough-shaped in cross-section and is provided with cylindrical end portions 20 and 21, respectively, formed with conduit-receiving passages 22 and 23 therethrough. The ends of the conduit-receiving passages 22 and 23 are internally threaded as at 24 so that the pulling and splicing fitting 16 may be incorporated in an electrical conduit line as an integral part thereof.

The cylindrical end portions 20 and 21 are externally threaded as at 26 and 27, respectively, to receive in threaded relationship a correspondingly threaded retaining nut 28 and a retainer nut 29.

Adjacent the opening 18, the body 17 is provided with longitudinally extending flange portions 30 and 31 forming an abutment surface to abuttingly engage corresponding flange surfaces 32 and 33 formed on the cover 19. The abutment surfaces 30, 31, 32, and 33 are made irregular in cross-section, for example, a tortuous path is provided by forming a plurality of parallel ribs and recesses forming intermating abutment means. Thus, the tortuous path between the abutment surfaces 30 and 32 and between the abutment surfaces 31 and 33 will be longer than the thickness of the flanges provided on the body 17 and the cover 19 and the tortuous path is preferably of a sufficient length so as to render the joint effected thereby explosion-proof.

The body 17 is provided with an annular shoulder 34 and an annular shoulder 35 located between the medial portion of the body 17 and the respective end portions 20 and 21. The cover 19, which extends between the end portions 20 and 21 is also provided with an end face 37 and an end face 38 lying in planar registry with the end faces established by the shoulders 34 and 35. A plurality of concentric ribs and recesses are formed on the end faces 37 and 38 and on the shoulders 34 and 35 so that a corresponding plurality of intermating concentrically spaced ribs and recesses 39 formed on the retainer nuts 28 and 29 will provide an intermating abutment surface forming an explosion-proof joint.

In use, the opening 18 is closed by the cover 19 and the retainer nuts 28 and 29 are threaded onto the end portions 20 and 21 so that the end faces 39 on the retainer nuts 28 and 29 will abuttingly engage the end faces 37 and 38 on the cover 19 and the shoulders 34 and 35 on the body 17. The intermating abutment surfaces between the cover 19 and the body 17 and between the cover 19 and the retainer nuts 28 and 29 as well as the intermating abutment surfaces between the body 17 and the retainer nuts 28 and 29 serve to maintain all of the various components in firm assembly with one another and also develop the dual function of forming an explosion-proof joint extending completely around the opening 18.

If it is desired to provide access to the interior of the body 17 by removing the cover 19 from the opening 18, either one of the retainer nuts 28 or 29 may be slacked off whereupon the cover 19 is readily dislodged from its assembled position on the body 17.

If it is desired that the cover 19 be made integral with the body 17, that is, non-removable from the body 17 but displaceable from the access opening 18, the modification of Figure 11 may be utilized. In this exemplary structure, the cover 19a is hingedly connected to the body 17a by means of a plurality of lugs 40 pivotally connected by pin means 41. Although Figure 11 is largely diagrammatic in character, the intermating abutment means are shown at 30a, 31a, 32a and 33a between the cover 19a and the body 17a.

In the embodiment of Figure 4 a slightly different abutment means is utilized between the cover and the body. In Figure 4 the cover is indicated at 19b and the body at 17b. It will be noted that the body 17b, being trough-shaped in cross-section, has a pair of flanges 44 extending between the cylindrical end portions and lying adjacent the open side thereof. Each of the flanges 44 is provided with a longitudinally extending recess 46 receiving a tongue 47 formed on the cover 19b so as to intermatingly engage the body 17b. The tongues 47 are formed on a pair of longitudinally extending flanges 48 of the cover 19b so that both of the tongues 47 may be inserted into the recesses 46 upon moving the cover 19b laterally with respect to the longitudinal axis of the body 17b. It will be understood that the end portions of the cover 19b and the body 17b are constructed in the manner described in connection with the embodiment of Figures 1–3 so that the retainer nuts may be turned into engaging abutment with the body and the cover, thereby to retain all of the components in firm assembly with one another.

The tortuous path provided between the flanges 48 and the flanges 44 by virtue of the interengagement of the tongues 47 and the recesses 46 provides an abutment joint which will be explosion-proof.

In Figure 5, a different form of abutment joint is shown. The cover 19c is provided with a longitudinally extending bead 50 received in a dovetailed slot 51 formed in the body 17c. It will be understood that the rib 50 and the slot 51 are intermating in character so as to provide an elongated path of greater length than the thickness of either the cover 19c or the body 17c. The path thus provided is of sufficient length to render the joint effected thereby explosion-proof. In assembling the cover 19c on the body 17c, the cover is slidably moved longitudinally to mate the bead 50 in the slot 51. It will be understood that both sides of the cover 19c are beaded and both sides of the body 17c are slotted and the rest of the structure is made similar to the embodiment of Figures 1–3 so that the components of the apparatus may be placed in firm assembly by means of the retainer nuts and the intermating abutment means form an explosion-proof joint completely surrounding the periphery of the opening in the body member.

In Figure 6, the cover 19d cooperates with a body 17d. An abutment joint is provided therebetween which comprises an elongated intermating abutment surface formed by an angularly inclined wall 52 and an angularly inclined wall 53 formed on the cover 19d and the body 17d, respectively. In the embodiment of Figure 6 the inclined surface 53 on the body 17d slopes angularly inwardly toward the inside of the body 17d so that the correspondingly sloped wall 52 on the cover 19d will mate therewith when the cover 19d is placed over the opening in the body 17d.

In the embodiment of Figure 7, a cover 19e and a body 17e are provided with intermating abutment surfaces comprising an irregularly shaped stepped rib 54 formed on the cover 19a and a correspondingly shaped recess 56 formed on the body 17e.

In Figures 8, 9 and 10, modified embodiments of the end structures and retainer nuts are shown.

In Figure 8 a body 17f has an opening 18f closed by a cover 19f. The body 17f is provided with a cylindrical end portion 21f externally threaded as at 27f. A retainer nut 29f is threaded onto the cylindrical end portion. The retainer nut 29f is provided with a neck 57 which telescopically receives the end of the cover 19f and an annular shoulder 35f formed on the body 17f. A snug fitting slip joint 58 provided between the neck 57 of the retainer nut 29f and the cover 19f and the body 17f provides a path of sufficient length to render the joint explosion-proof.

In Figure 9, a body 17g having an opening 18g is closed by a cover 19g. The body 17g is provided with a cylindrical end portion 21g externally threaded as at 27g to receive in threaded relationship a retainer nut 29g. The end portion of the cover 19g is threaded as at 59 and the body 17g is provided with an annular shoulder 35g which is threaded as at 60. The retainer nut 29g is provided with a neck 57g threaded to receive in assembly therewith the cover 19g and the body 17g. The threaded joint between the retainer nut 29g, the cover 19g and the body 17g contains a sufficient number of threads to render the joint effected thereby explosion-proof.

In Figure 10, a body 17h having an opening 18h is closed by a cover 19h. The body 17h is provided with a cylindrical end portion 21h externally threaded as at 27h to receive in threaded relationship therewith a retainer nut 29h. The end portion of the cover 19h is provided with an angularly inclined abutment surface 61 and the body 17h is provided with an annular shoulder 35h angularly beveled to provide an abutment surface 62. The retainer nut 29h is provided with a tapered neck 57h which engagingly abuts the end of the cover 19h and the end of the shoulder 35h of the body 17h. The intermating abutment surface between the retainer nut 29h and the cover 19h and the body 17h is elongated and is of a sufficiently long traverse as to render the joint effected thereby explosion-proof.

It will be understood that any of the end constructions shown in Figures 8, 9 and 10 may be used in cooperation with the cover and body constructions shown in Figures 3–7. In this regard, it should be pointed out that the retainer nuts 29f and 29g of the Figure 8 and 9 embodiments are each provided with an annular shoulder 63f and 63g, respectively, to limit relative axial movement of the retainer nuts 29f and 29g. The mode of assembly, in each instance, would follow generally the mode of assembly described in detail in connection with the embodiment of Figures 1–3.

Although various minor structural modifications might be suggested by those versed in the art, it should be understood that I wish to embody within the scope of the patent warranted hereon all such modifications as are reasonably included within the scope of my contribution to the art.

I claim as my invention:

1. An explosion-proof container for electrical apparatus comprising a body trough shaped in cross section and having cylindrical necks at opposite ends, thread means formed on the peripheral surfaces of said necks, one side of said body between said necks forming an opening providing access to the interior of said body, a cover for said opening and engaging said body at longitudinally extending abutment surfaces formed on said body at the edges of said opening and on said cover, respectively, said abutment surfaces being shaped to provide a flame-proof path of greater length than the thickness of the body and the cover at said abutment surfaces, said cover and said body together providing a portion of larger diameter than said reduced necks longitudinally inwardly of said necks and having formed thereon a first circumferentially continuous abutment surface adjacent each of said necks, and a nut threaded on each neck, each said nut having a second circumferentially continuous abutment surface formed thereon complementary to and engaging with said first abutment surface upon axial advance of said nut on said neck to lock said cover to said body member and to form a flame-proof path between said first and second abutment surfaces, said neck having openings extending therethrough adapted to receive conduits, whereby said body member may be permanently received in a conduit, said first and second abutment surfaces constituting radially extending confronting surfaces having a plurality of concentric radially spaced ribs and recesses formed therein.

2. An explosion-proof container as defined in claim 1, said longitudinally extending abutment surfaces having formed therein a dovetail recess and a bead received in said recess together forming said flame-proof path.

3. An explosion-proof container as defined in claim 1, said longitudinally extending abutment surfaces being angularly offset and beveled to form said flame-proof path.

4. An explosion-proof container as defined in claim 1, said longitudinally extending abutment surfaces having formed therein a rib irregular in cross section and a recess of corresponding shape together forming said flame-proof path.

5. An explosion-proof container as defined in claim 1, and hinge means between one side of said cover and said body to pivot said cover away from said body.

References Cited in the file of this patent

UNITED STATES PATENTS

| | | |
|---|---|---|
| 29,040 | Rowe | July 3, 1860 |
| 601,931 | Black | Apr. 5, 1898 |
| 608,412 | Patten et al. | Aug. 2, 1898 |
| 667,953 | Ross | Feb. 12, 1901 |
| 963,248 | Ramelli | July 5, 1910 |
| 1,010,080 | Shreve | Nov. 28, 1911 |
| 1,229,665 | Sixma | June 12, 1917 |
| 1,724,999 | Franke et al. | Aug. 20, 1929 |

FOREIGN PATENTS

| | | |
|---|---|---|
| 10,296 | Great Britain | 1905 |
| 402,991 | Italy | Mar. 31, 1943 |